(12) United States Patent (10) Patent No.: US 7,202,904 B2
Wei (45) Date of Patent: Apr. 10, 2007

(54) VIDEO MONITORING DEVICE

(75) Inventor: David Wei, Taipei (TW)

(73) Assignee: E-Benk Tech Co., Ltd., Junghe (TW)

( * ) Notice: Subject to any disclaimer, the term of this patent is extended or adjusted under 35 U.S.C. 154(b) by 776 days.

(21) Appl. No.: 10/689,582

(22) Filed: Oct. 22, 2003

(65) Prior Publication Data

US 2005/0088571 A1 Apr. 28, 2005

(51) Int. Cl.
*H04N 5/225* (2006.01)
*H04N 5/232* (2006.01)
*H04N 9/47* (2006.01)
*H04N 7/14* (2006.01)
*G03B 17/00* (2006.01)

(52) U.S. Cl. .................. 348/373; 348/211.1; 348/143; 348/14.05; 396/427

(58) Field of Classification Search ................ 348/373, 348/375
See application file for complete search history.

(56) References Cited

U.S. PATENT DOCUMENTS 4,736,218 A * 4/1988 Kutman ...................... 396/427
5,028,997 A * 7/1991 Elberbaum ................... 348/143
5,473,368 A * 12/1995 Hart ............................ 348/14
5,734,414 A * 3/1998 Nishimura et al. .......... 348/373
6,124,892 A * 9/2000 Nakano ....................... 348/373
6,356,308 B1 * 3/2002 Hovanky ................. 348/211.1
6,830,388 B2 * 12/2004 Kajino et al. ............... 348/143
6,831,697 B1 * 12/2004 Chang ........................ 348/375
6,939,061 B2 * 9/2005 Sawada ....................... 348/373

* cited by examiner

*Primary Examiner*—David Ometz
*Assistant Examiner*—Nhan Tran
(74) *Attorney, Agent, or Firm*—Pai Patent & Trademark Law Firm; Chao-Chang David Pai

(57) ABSTRACT

A video monitoring device is constructed to include a casing formed of a hollow bottom shell and a top cover, which covers the bottom shell and is horizontally rotatable on the bottom shell, a camera turnable about a horizontal pivot at the top cover, and a driver mounted inside the bottom shell and controlled to rotate the top cover and the camera horizontally on the bottom shell and to turn the cameral vertically about the horizontal pivot.

8 Claims, 4 Drawing Sheets

VIDEO MONITORING DEVICE

BACKGROUND OF THE INVENTION

1. Field of the Invention

The present invention relates to a video monitoring device and, more particularly, to a video monitoring device connectable to a computer or surveillance system for monitoring a particular place.

2. Description of the Related Art

Conventional computer connectable web cameras and video monitoring devices have a limited monitoring angle when installed. When a web camera or video monitoring device is fixed in position, the monitoring angle of the web camera or video monitoring device is not freely changeable. To change the monitoring angle, the web camera or video monitoring device must be adjusted manually.

Therefore, it is desirable to provide a video monitoring device that can be controlled to change its monitoring angle automatically.

BRIEF SUMMARY OF THE INVENTION

The present invention has been accomplished under the circumstances in view. It is the main object of the present invention to provide a video monitoring device that can be controlled to adjust the video monitoring angle horizontally as well as vertically.

To achieve this and other objects of the present invention, the video monitoring device comprises a casing, a camera, and a driver. The casing comprises a hollow bottom shell having an upright shaft, and a top cover covering the hollow bottom shell and fastened pivotally with the upright shaft for clockwise/counter-clockwise rotation on the upright shaft horizontally. The camera is pivotally connected to the top cover by a horizontal pivot, and adapted to pick up images and to convert received images into electronic signals for transmitting to an electronic apparatus. The driver is mounted inside the hollow bottom shell, comprising a first driving unit adapted to rotate the top cover on the upright shaft and a second driving unit adapted to turn the camera about the horizontal pivot. The first driving unit comprises a fixed gear wheel fixedly mounted on the upright shaft inside the hollow bottom shell, a circuit board fixedly fastened to the top cover, a reversible motor fixedly mounted on the circuit board, and a transmission mechanism coupled between the fixed gear wheel and the reversible motor of the first driving unit. The second driving unit comprises a flat supporting plate fixedly fastened to a bottom side of the camera, an eccentric wheel axially extended in parallel to the horizontal pivot, and a motor fixedly mounted on the circuit board and adapted to rotate the eccentric wheel. The flat supporting plate has a bottom opening coupled to the eccentric wheel for enabling the flat supporting plate to be moved up and down upon rotary motion of the eccentric wheel.

DETAILED DESCRIPTION OF THE PREFERRED EMBODIMENT

Figure 1:
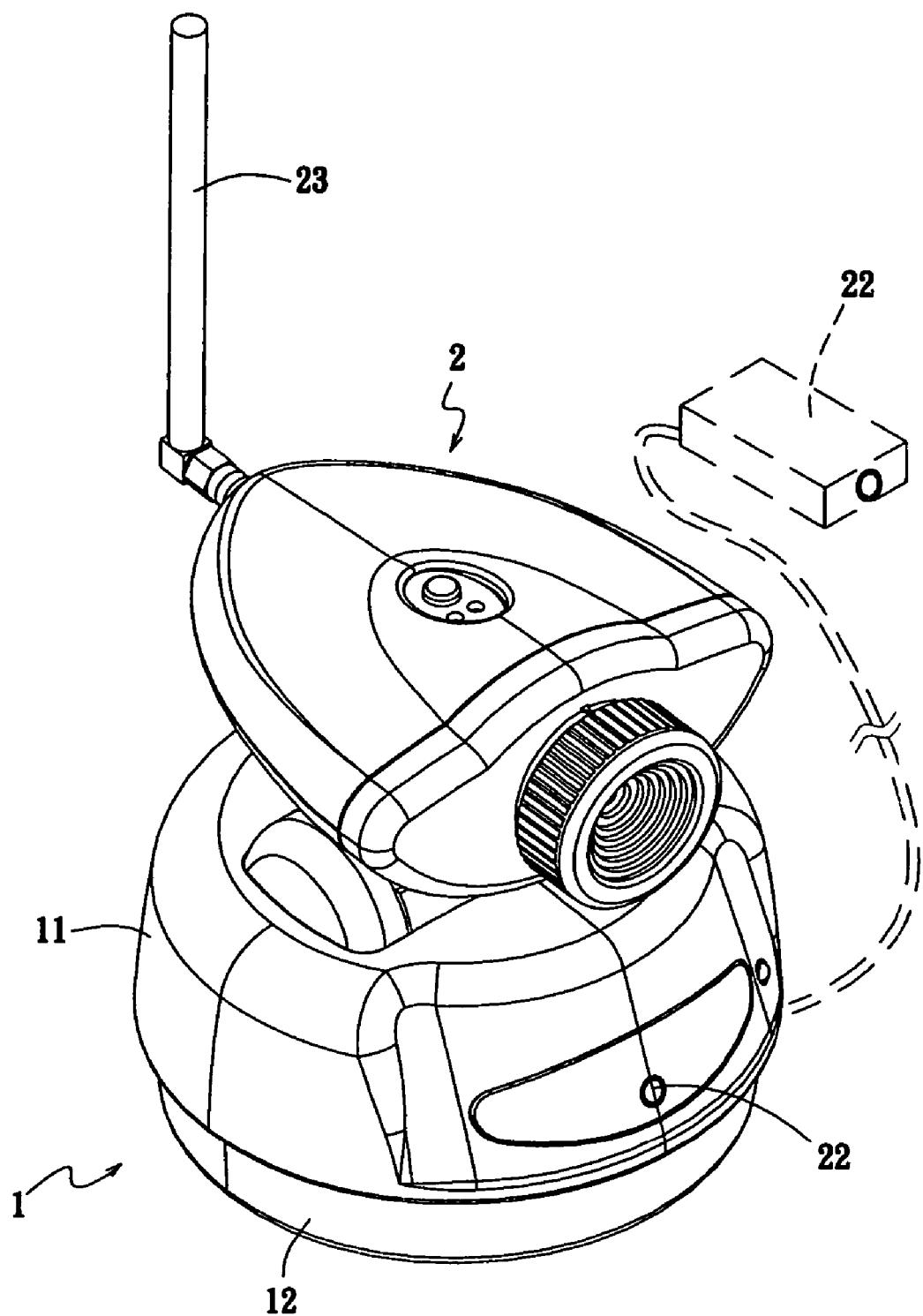
FIG. 1 is an elevational view of a video monitoring device according to the present invention.
Figure 2:
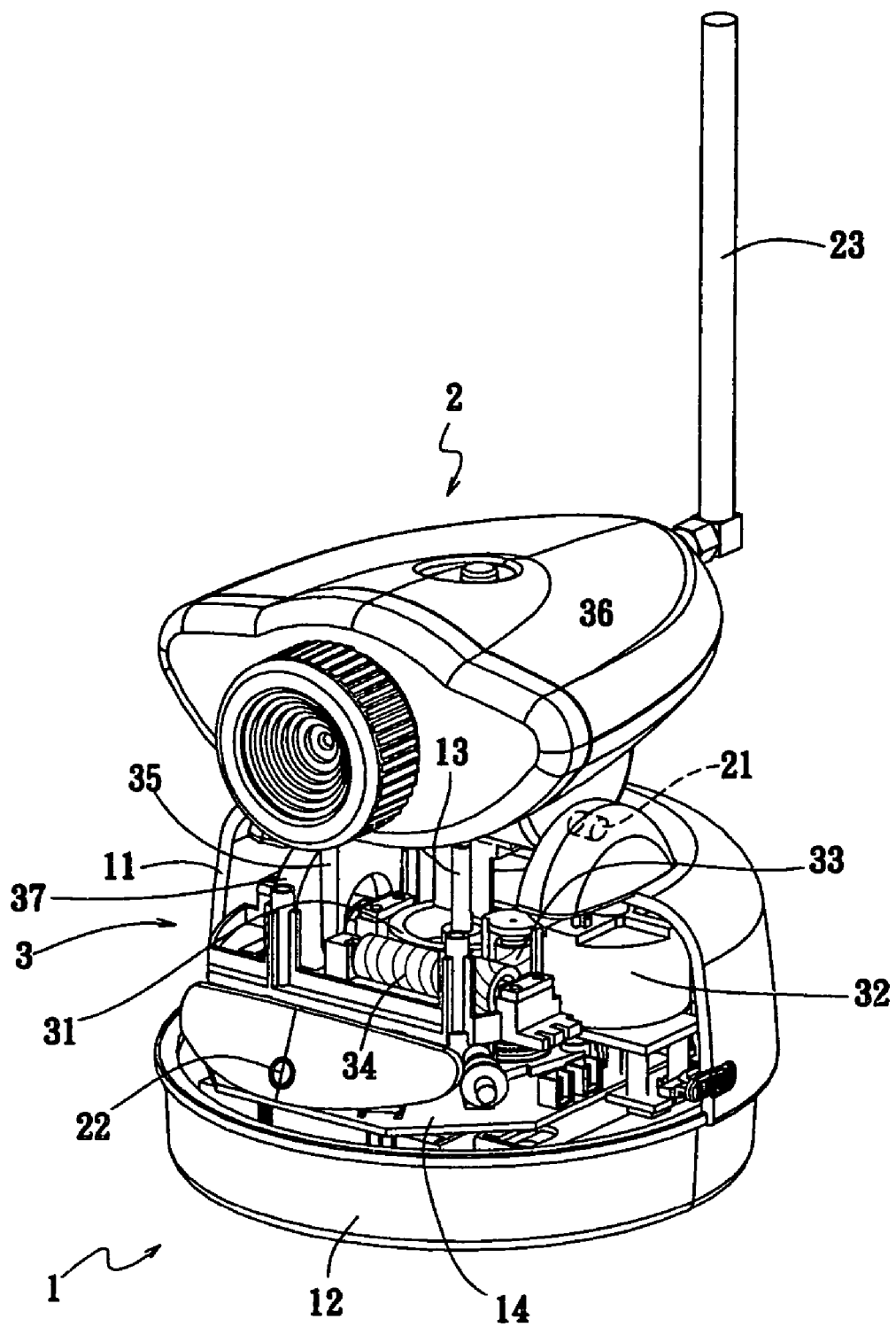
FIG. 2 is a cutaway view of the video monitoring device according to the present invention.
Figure 3:
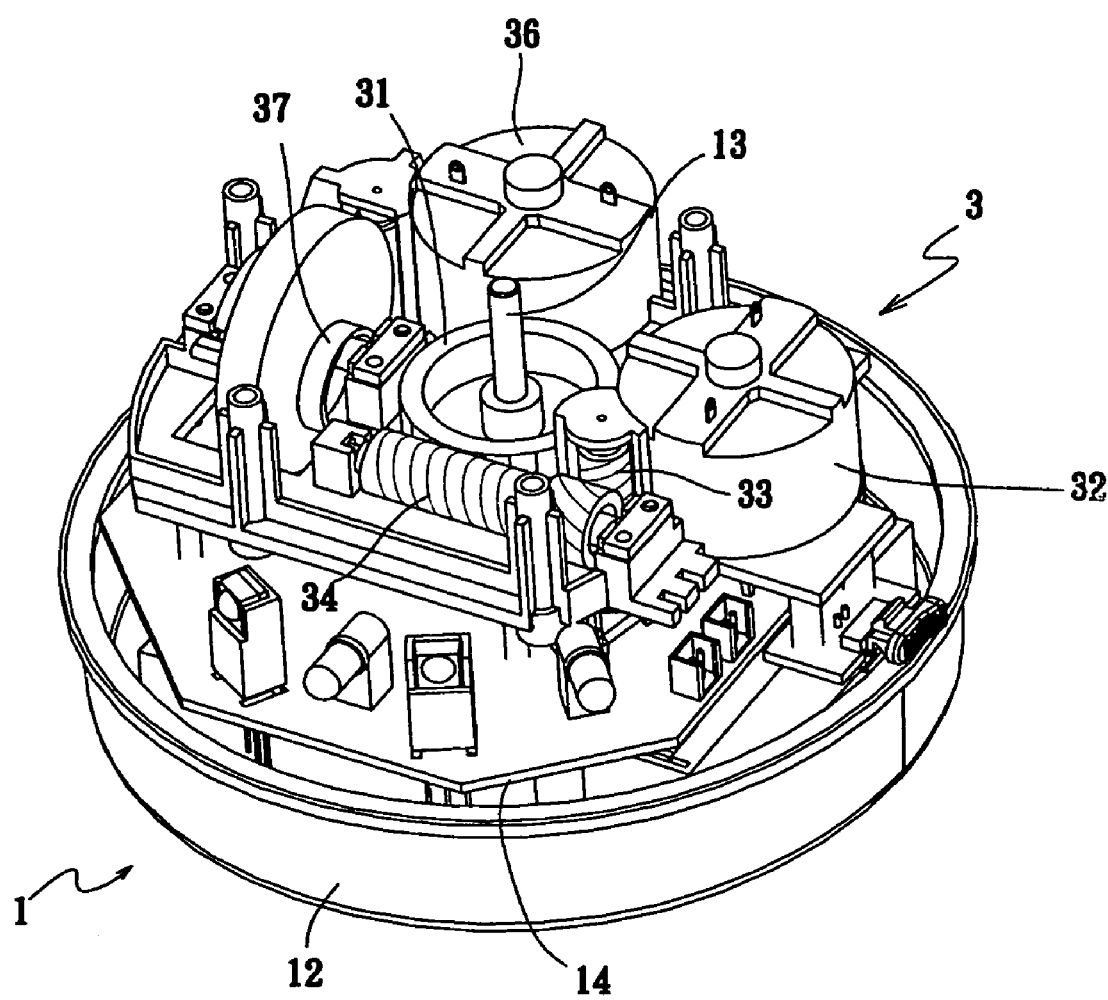
FIG. 3 is an elevational view of a part of the present invention, showing the arrangement of the driver in the bottom shell.

Referring to FIGS. 1 through 3, a video monitoring device in accordance with the present invention generally comprises a casing 1, a camera 2, and a driver 3.

The casing 1 comprises a top cover 11 and a hollow bottom shell 12. The top cover 11 and the bottom shell 12 can be closed together, defining a receiving chamber. The bottom shell 12 has an upright shaft 13. The top cover 11 is fastened pivotally with the upright shaft 13, and can be rotated clockwise as well as counter-clockwise on the bottom shell 12.

The camera 2 has an image sensor, for example, a 0.3 Mega Pixels CCD (charge coupled device) adapted to pick up images and to convert received images into electronic signals for transmitting to an electronic apparatus, such as computer, TV, or the like. The camera 2 is pivotally fastened to the top cover 11 by a horizontal pivot 21 so that the angle of inclination of the camera 2 can be adjusted relative to the top cover 11 and the casing 12.

The driver 3 is mounted in the receiving chamber inside the bottom shell 12, comprising a first driving unit and a second driving unit.

The first driving unit of the driver 3 comprises a fixed gear wheel 31 fixedly mounted on the upright shaft 13 inside the bottom shell 12, a circuit board 14 fixedly fastened to the top cover 11, a reversible motor 32 mounted on the circuit board 14, and a transmission mechanism coupled between the fixed gear wheel 31 and the output shaft of the motor 32. According to this embodiment, the transmission mechanism comprises a pinion 33 fixedly mounted on the output shaft of the motor 32, and a worm 34 meshed between the pinion 33 and the fixed gear wheel 31. Because the worm 34 is meshed between the pinion 33 and the fixed gear wheel 31, rotating the reversible motor 32 causes the top cover 11 to be rotated on the upright shaft 13 relative to the bottom shell 12. Switch means may be provided to control clockwise/counter-clockwise rotation of the top cover 11 relative to the bottom shell 12 within 12~120° angles.

Figure 4:
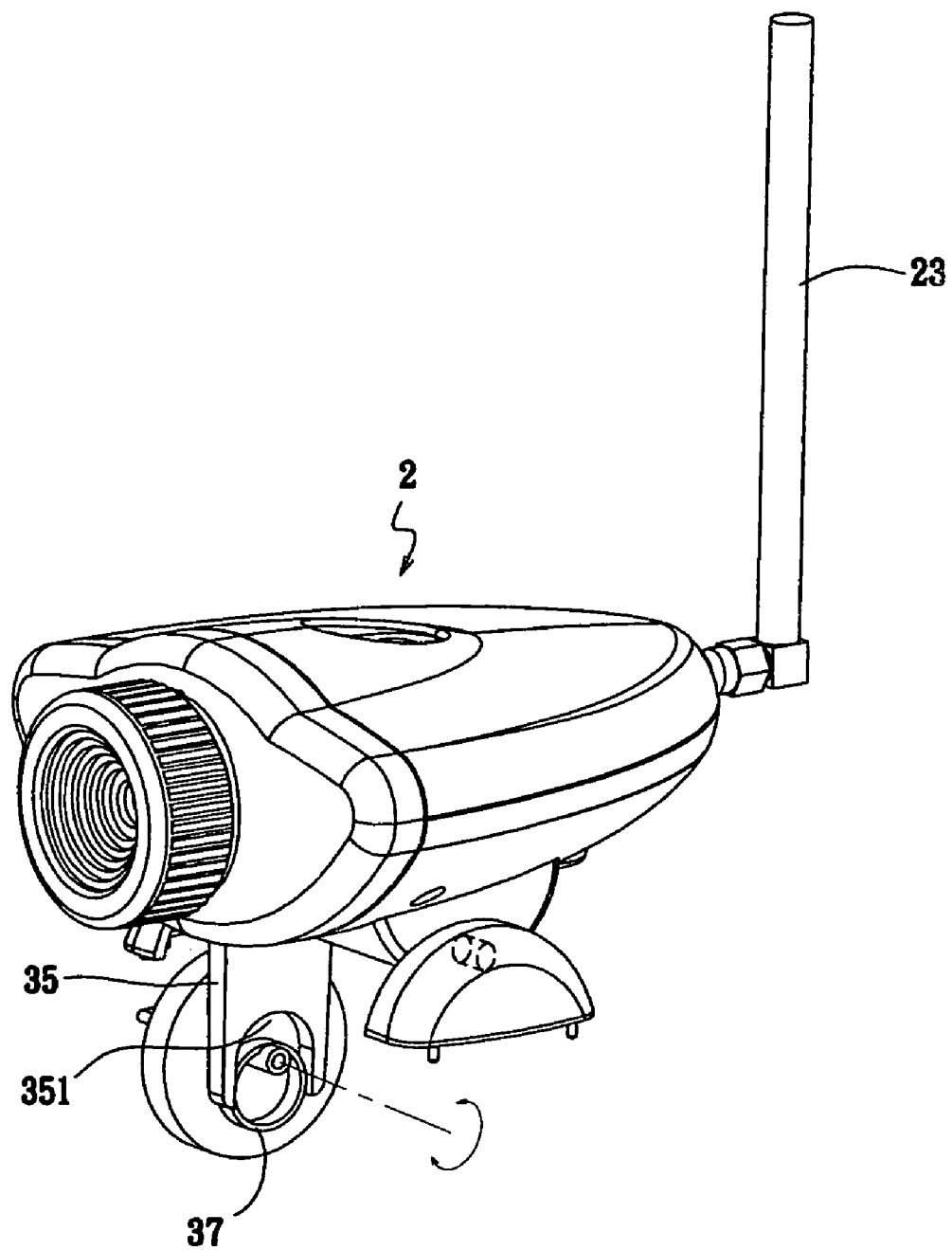
FIG. 4 is a schematic drawing showing adjustment of angle of inclination of the camera.

Referring also to FIG. 4, the second driving unit of the driver 3 comprises a flat supporting plate 35 fixedly fastened to the bottom side of the camera 2, a motor 36 fixedly mounted on the circuit board 14, and an eccentric wheel 37 axially extended in parallel to the horizontal pivot 21 and rotatable by the motor 36. The supporting plate 35 has a bottom opening 351 adapted to accommodate the eccentric wheel 37. When the motor 36 is run to rotate the eccentric wheel 37, the supporting plate 35 is alternatively moved up and down, and the camera 2 is forced by the supporting plate 35 to turn about the horizontal pivot 21, changing its angle of inclination. Switch means may be used to control turning of the camera 2 about the horizontal pivot 21 within 2~40° angles.

Referring to FIG. 1 again, an infrared receiving unit 22 is installed in the circuit board 14, and adapted to receive control signal from an infrared remote controller for controlling the operation of the driver 3. Because an infrared remote controller has distance and angle limitations, the infrared receiving unit 22 can be connected to the circuit board 14 by an electric wire and installed in a place outside the video monitoring device for convenient control by an infrared remote controller.

With respect to video signal transmission, the invention adopts wireless transmission, i.e., an antenna 23 is provided at the rear side of the camera 2 and adapted to transmit video signal by means of 2.4 GHz radio carrier, which is receivable by a computer having a compatible radio receiver. It is workable to transmit video signal from the camera 2 to a computer through a USB (universal serial bus) cable, to a TV through a RCA cable, or to a remote computer through the Internet.

A prototype of video monitoring device has been constructed with the features of FIGS. 1~4. The video monitoring device functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A video monitoring device comprising:
   a casing, said casing comprising a hollow bottom shell, said hollow bottom shell having an upright shaft, and a top cover covering said hollow bottom shell and fastened pivotally with said upright shaft for clockwise/counter-clockwise rotation on said upright shaft horizontally;
   a camera pivotally connected to said top cover by a horizontal pivot and adapted to pick up images and to convert received images into electronic signals for transmitting to an electronic apparatus; and
   a driver mounted inside said hollow bottom shell, said driver comprising a first driving unit adapted to rotate said top cover on said upright shaft and a second driving unit adapted to turn said camera about said horizontal pivot, said first driving unit comprising a fixed gear wheel fixedly mounted on said upright shaft inside said hollow bottom shell, a circuit board fixedly fastened to said top cover, a reversible motor fixedly mounted on said circuit board, and a transmission mechanism coupled between said fixed gear wheel and the reversible motor of said first driving unit, said second driving unit comprising a flat supporting plate fixedly fastened to a bottom side of said camera, an eccentric wheel axially extended in parallel to said horizontal pivot, and a motor fixedly mounted on said circuit board and adapted to rotate said eccentric wheel, said flat supporting plate having a bottom opening coupled to said eccentric wheel for enabling said flat supporting plate to be moved up and down upon rotary motion of said eccentric wheel.

2. The video monitoring device as claimed in claim 1, wherein the reversible motor of said first driving unit is controlled to rotate said top cover on said upright shaft within 120° angles.

3. The video monitoring device as claimed in claim 1, wherein the motor of said second driving unit is controlled to rotate said eccentric wheel within 40° angles.

4. The video monitoring device as claimed in claim 1, further comprising a wireless transmitting module adapted to transmit output signal from said camera to an external electronic apparatus.

5. The video monitoring device as claimed in claim 1, further comprising a USB (universal serial bus) cable adapted to connect said camera to an external electronic apparatus for transmitting signal.

6. The video monitoring device as claimed in claim 1, further comprising a wireless transmitting module adapted to transmit output signal from said camera to a remote electronic apparatus.

7. The video monitoring device as claimed in claim 1, wherein said camera is connectable to the Internet.

8. The video monitoring device as claimed in claim 1, further comprising an infrared receiving unit adapted to receive infrared control signal from an infrared remote controller to control the operation of said driver.

* * * * *